United States Patent [19]
Bianco

[11] Patent Number: 5,175,420
[45] Date of Patent: Dec. 29, 1992

[54] BAR CODE SCANNER HAVING A LIGHT SOURCE/PHOTODETECTOR MOVABLE IN A RASTER PATTERN

[76] Inventor: James S. Bianco, 217 Brainard Rd., Enfield, Conn. 06082

[21] Appl. No.: 672,358

[22] Filed: Mar. 20, 1991

[51] Int. Cl.$^5$ .......... G06K 7/10; F16H 21/16; H04N 3/02
[52] U.S. Cl. .......... 235/462; 235/454; 74/27; 358/199; 358/497
[58] Field of Search .......... 235/439, 454, 461, 462, 235/467, 480, 435, 475; 74/25, 27, 28, 44, 57; 358/93, 125, 139, 199, 474, 494, 497; 382/66

[56] References Cited

U.S. PATENT DOCUMENTS

| | | | |
|---|---|---|---|
| 2,711,101 | 6/1955 | Watter | 74/27 |
| 3,645,626 | 2/1972 | Druschel | 235/470 |
| 3,683,706 | 8/1972 | O'Neill | 74/27 |
| 4,349,741 | 9/1982 | Bobart et al. | 235/462 |
| 4,496,831 | 1/1985 | Swartz et al. | 235/472 |
| 4,799,164 | 1/1989 | Hellekson et al. | 235/467 |
| 4,922,087 | 5/1990 | Nakajima et al. | 358/497 X |
| 4,926,033 | 5/1990 | Kobayashi | 235/475 |
| 4,939,356 | 7/1990 | Rando et al. | 235/467 |
| 4,988,851 | 1/1991 | Kohno et al. | 235/383 |
| 5,015,831 | 5/1991 | Eastman et al. | 235/470 |
| 5,015,832 | 5/1991 | Filipski et al. | 235/462 |

FOREIGN PATENT DOCUMENTS

| | | | |
|---|---|---|---|
| 379644 | 8/1923 | Fed. Rep. of Germany | 74/25 |
| 2-232789 | 9/1990 | Japan | 235/470 |
| 2186940 | 8/1987 | United Kingdom | 74/25 |

Primary Examiner—John W. Shepperd
Assistant Examiner—Edward H. Sikorski
Attorney, Agent, or Firm—John H. Crozier

[57] ABSTRACT

Apparatus for reading bar codes on integrated circuit wafers during both the integrated circuit manufacturing process and the wafer manufacturing process which include placing a wafer in fixed position over a bar code scanner. The scanner includes a motor whose gearing moves a reader head in a linear raster pattern at a constant focal point over the bar code. The bar code scanner may be retrofitted to existing reading equipment used in the manufacture of the wafers or in the manufacture of the integrated circuits. In another aspect of the invention, the bar code scanner may be provided as part of a desk-top unit. The present invention is especially useful in reading bar codes in any situation where the bar codes are difficult to read because of varying print-/contrast and reflectivity.

17 Claims, 6 Drawing Sheets

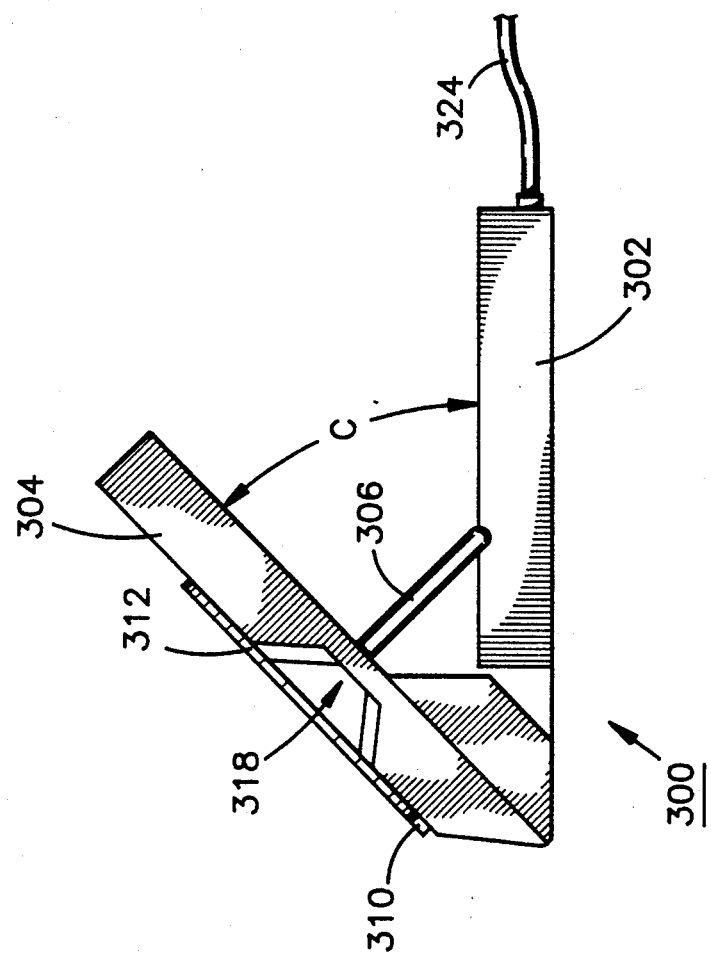
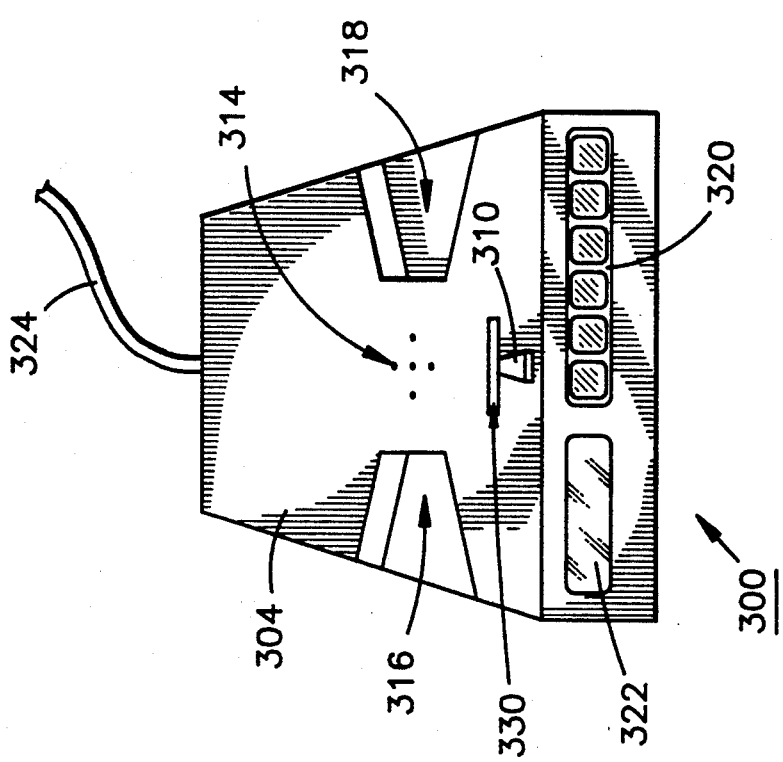

BAR CODE SCANNER HAVING A LIGHT SOURCE/PHOTODETECTOR MOVABLE IN A RASTER PATTERN

BACKGROUND OF THE INVENTION

1. Field of the Invention

The present invention relates to the reading of bar codes generally and, more particularly, to novel apparatus for reading bar codes, particularly those having variable print/contrast ratios, such as are encountered, for example, on silicon wafers during both the manufacture of the wafers and the manufacture of the integrated circuits on the wafers, during the production of heat treated parts such as turbine blades, during the manufacture of nuclear rods, and during the manufacture of compact disks.

2. Background Art

Conventional means for reading bar codes are generally unsatisfactory for reading bar codes which have variable print/contrast ratios. Such bar codes are encountered, for example on silicon wafers during both the manufacture of the wafers and the manufacture of the integrated circuits on the wafers, on heat treated parts such as turbine blades during their production, on nuclear rods during their manufacture, and on compact disks during their manufacture. The problem with reading such bar codes is that the print/contrast ratios and reflectivity of the bar codes can change greatly as process steps are carried out and can even vary greatly across a given bar code.

While the present invention is described in detail as being applied to the reading of bar codes on silicon wafers, the teaching of the invention can be applied to the reading of a wide range of bar codes, and particularly difficult to read bar codes as indicated by, but not limited to, the above examples.

Integrated circuits have found extensive use in digital data processing equipment and have permitted the size of such equipment to shrink by many orders of magnitude. In the manufacturing process, a number of such circuits are formed on a silicon wafer disk by successive deposition and etching steps, following which the disk is cut into individual circuits, or chips.

The wafers are marked with identifying bar codes which are typically etched into the surfaces of the wafers by the manufacturer of the wafers. It is critical that such bar codes be accurately read as the wafers move through the circuit manufacturing process to ensure that the proper operations are performed and to identify the wafers before being cut. Conventional bar code reading devices used in such equipment provide poor performance, due to changing print/contrast ratios as the wafers move through the manufacturing process and due to the wide ranging reflectivity of the bar codes, the latter resulting from the fact that the bar codes are not printed on the wafers but are laser-etched into the surfaces thereof. If the bar code reader is of the scanning type having an oscillating light beam, there is a changing focal point as the bar code is scanned from end to end. The types of readers that have a detector of constant distance from the wafer require the additional complication that the position of the wafer be changed as attempts are made to read the bar code.

Therefore, it would be desirable to have reliable means by which bar codes can be read during the manufacture of integrated circuits and also as a means of verification in the wafer manufacturing process and in other cases in which bar codes are difficult to read using conventional equipment.

Accordingly, it is a principal object of the present invention to provide means for reading bar codes having variable print/contrast and reflectivities.

It is an additional object of the invention to provide such means that reads the bar codes at a constant focal point.

It is a further object of the invention to provide such means that can be employed to read bar codes on silicon wafers used in the manufacture of integrated circuits both during the manufacture of the circuits and during the manufacture of the wafers.

It is a another object of the invention to provide such means that does not require re-positioning of silicon wafers during the reading of bar codes thereon.

It is yet an additional object of the invention to provide such means that can be retrofitted to existing equipment employed in the wafer and integrated circuit manufacturing processes.

It is yet a further object of the invention to provide such means that provides relatively rapid reading of such bar codes.

Other objects of the present invention, as well as particular features and advantages thereof, will be elucidated in, or be apparent from, the following description and the accompanying drawing figures.

SUMMARY OF THE INVENTION

The present invention achieves the above objects, among others, by providing, in a preferred embodiment, means for reading bar codes on integrated circuit wafers during both the integrated circuit manufacturing process and the wafer manufacturing process which include placing a wafer in fixed position over a bar code scanner. The scanner moves a reader head in a linear raster pattern at a constant focal point over the bar code. The bar code scanner may be retrofitted to existing reading equipment used in the manufacture of the wafers or in the manufacture of the integrated circuits. In another aspect of the invention, the bar code scanner may be provided as part of a desk-top unit. The present invention is especially useful in reading bar codes in any situation where the bar codes are difficult to read because of varying print/contrast and reflectivity.

BRIEF DESCRIPTION OF THE DRAWING

The invention will be better understood if reference is made to the accompanying Drawing, provided for illustration only and not intended to limit the scope of the present invention, in which:

FIG. 11 is a front elevational view illustrating the use of the bar code scanner in a desktop embodiment.

FIG. 12 is a side elevational view of the embodiment of FIG. 11.

DETAILED DESCRIPTION OF THE PREFERRED EMBODIMENTS

Figure 1:
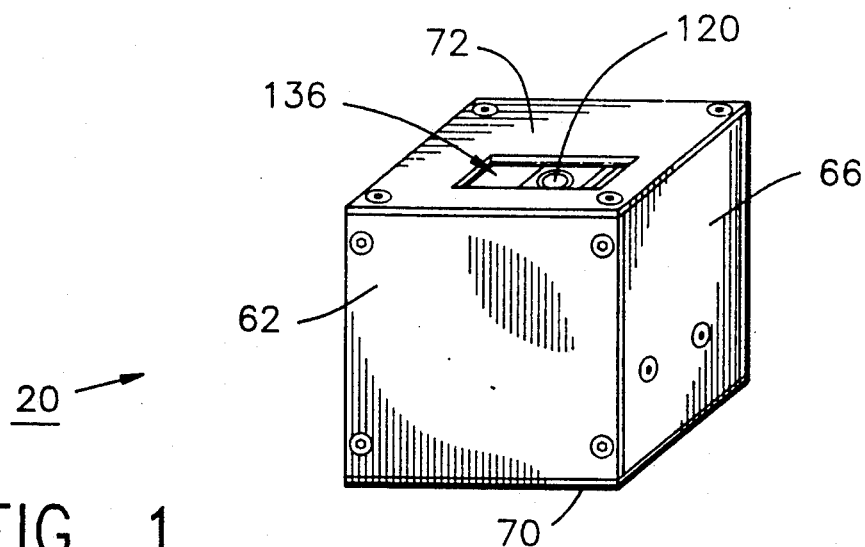
FIG. 1 is a top/front/right side perspective view of a bar code reader scanner constructed according to the present invention.

Referring now to the Drawing, the same or similar elements are given consistent identifying numerals throughout the various views thereof. Parenthetical references to figures give the figure(s) in which the element(s) are most clearly seen, although the element(s) may be seen on other figures also.

Figure 8:
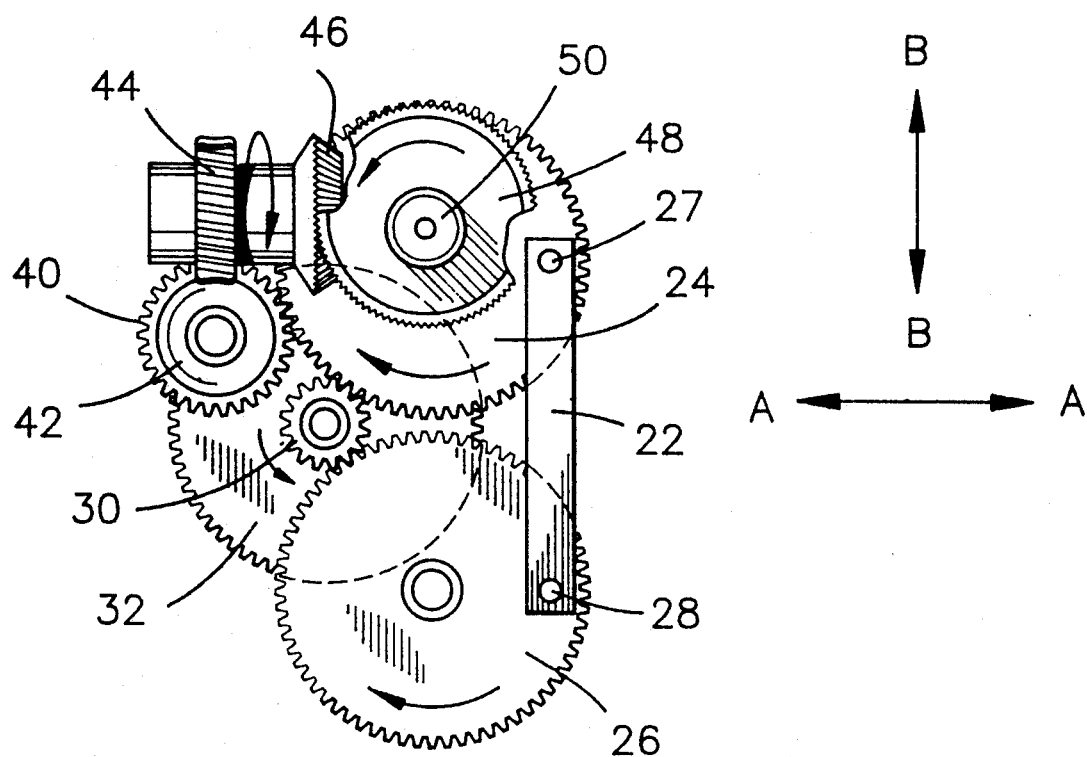
FIG. 8 is a fragmentary top plan view of a portion of the mechanism of the bar code scanner.

While FIGS. 1-4 show more complete views of the bar code scanner of the present invention, generally indicated by the reference numeral 20, reference first to FIG. 8 will aid in understanding the means by which motions are provided for linear raster scanning. A guide bar 22 is rotatably fixed to rotating guide bar gears 24 and 26 by means of screws 27 and 28 (also FIG. 6), the screws being fixedly attached to the guide bar while smooth portions of the screw pass through the gears in nonfixed engagement for relative rotational movement between the screws and the gears. Guide bar gears 24 and 26 are mounted on a horizontal support shelf 140. When guide bar gears 24 and 26 rotate as indicated by the arrows shown inside the peripheries thereof, guide bar 22 will have an overall rotary motion but will also have a continuous, back-and-forth, X-axis component of motion as indicated by the arrows "A—A" on FIG. 8.

Figure 9:
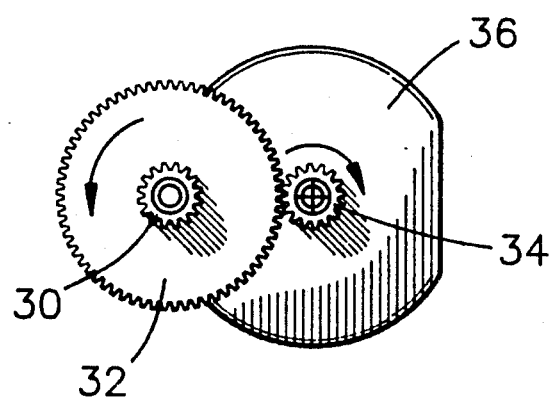
FIG. 9 is a fragmentary top plan view of another portion of the mechanism of the bar code scanner.

With reference also now to FIG. 9, guide bar gears 24 and 26 are driven by the engagement therewith of center gear 30 of drive gear assembly 32. Drive gear assembly 32 is driven by engagement of the outer periphery thereof with a shaft gear 34 on a motor 36.

Figure 5:
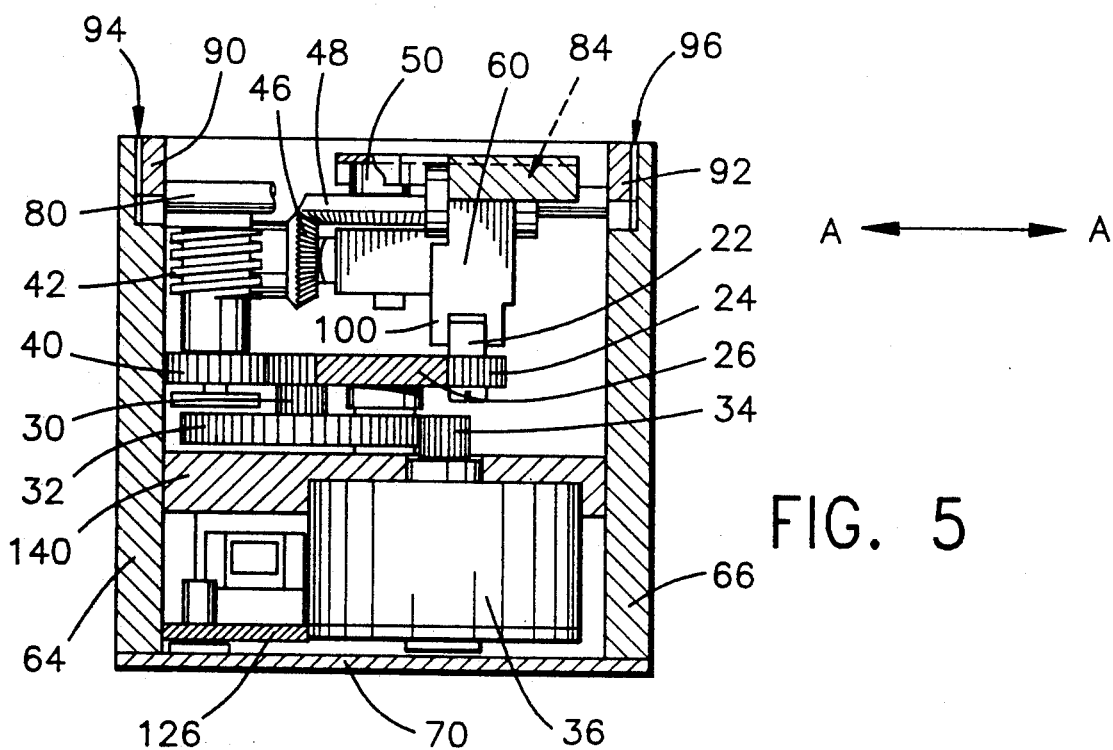
FIG. 5 is a cross-sectional side elevational view taken along line "5—5" of FIG. 4.
Figure 6:
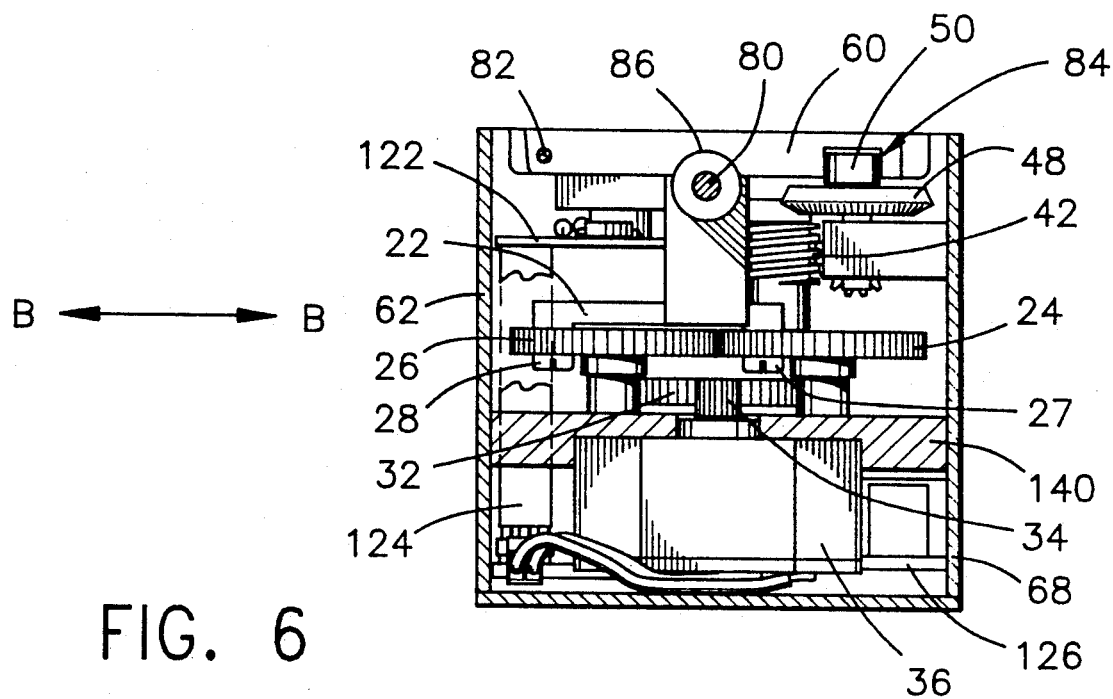
FIG. 6 is a cross-sectional side elevational view taken along line "6—6" of FIG. 4.

Referring again to FIG. 8, guide bar gear 24 engages and causes to rotate a secondary drive gear 40 having coaxially mounted thereon a worm 42 (also FIGS. 5 and 6). Worm 42, in turn, engages and causes a gear 44 to rotate. A bevel gear 46 mounted on a common shaft with gear 44 engages and causes to rotate a cam guide gear 48 upon which is off-centerly rotatably mounted a cam guide 50. It can be seen that as cam guide gear 48 rotates, cam guide 50 will have a an overall rotary motion but will also have a continuous, back-and-forth, Y-axis component of motion as indicated by the arrows "B—B" on FIG. 8.

Figure 2:
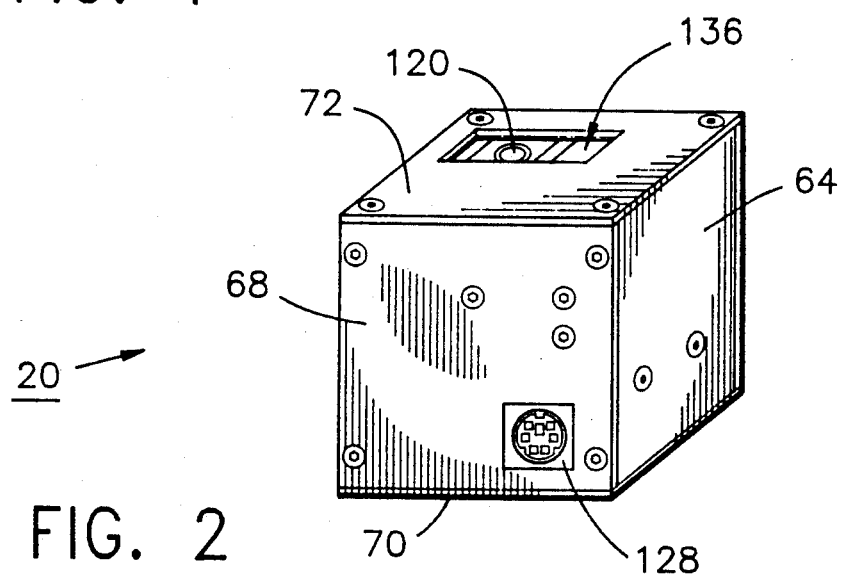
FIG. 2 is a top/rear/left side perspective view of the embodiment of the bar code scanner.
Figure 3:
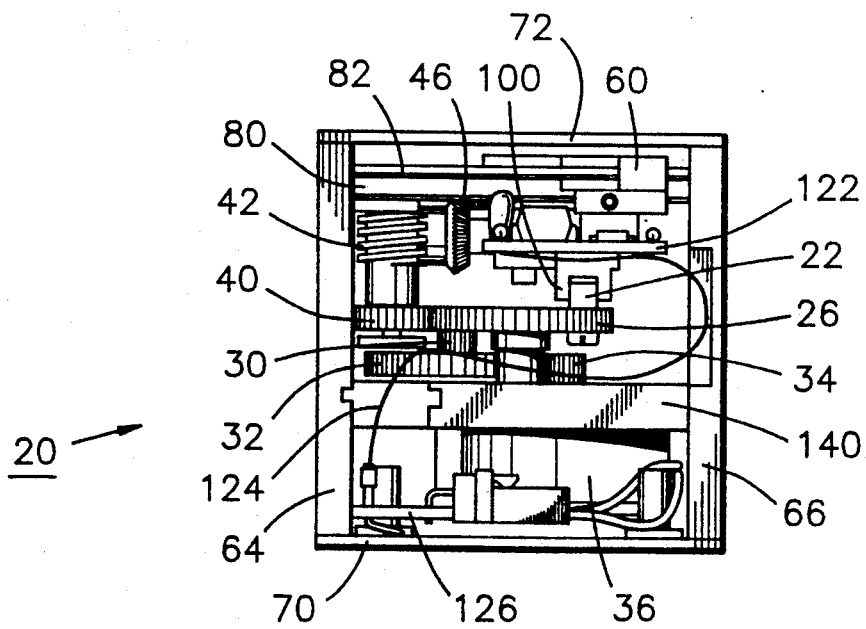
FIG. 3 is a front elevational view with the front cover removed of the bar code scanner.
Figure 4:
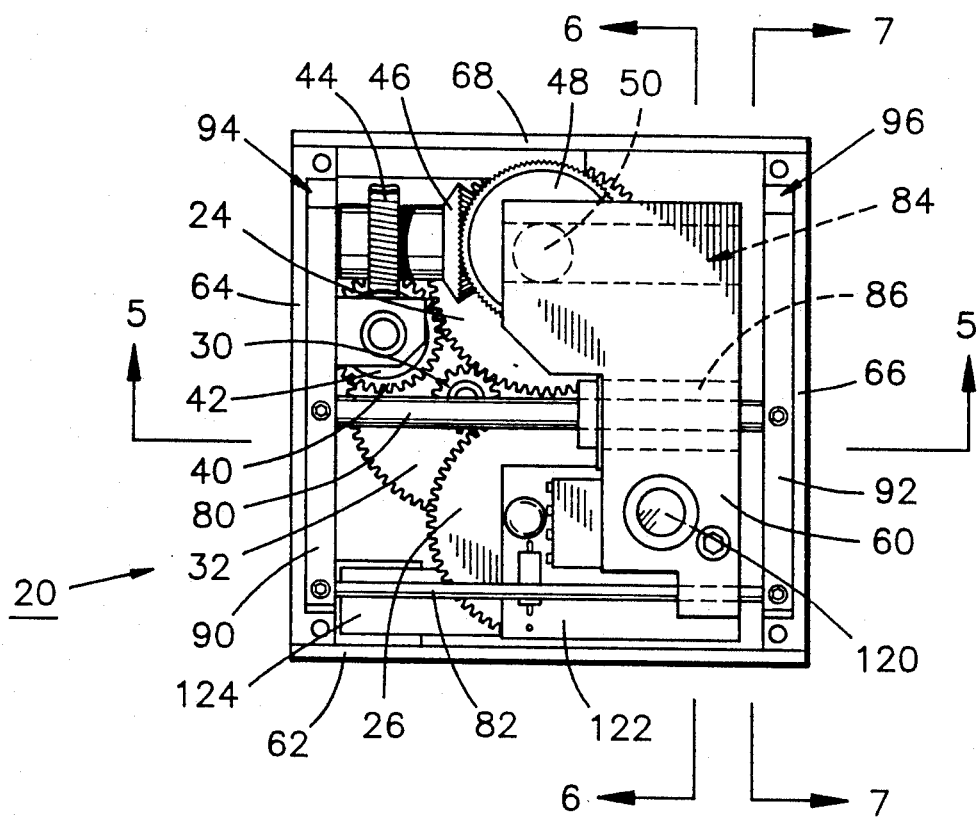
FIG. 4 is a top plan view of the bar code scanner with the top cover removed.
Figure 7:
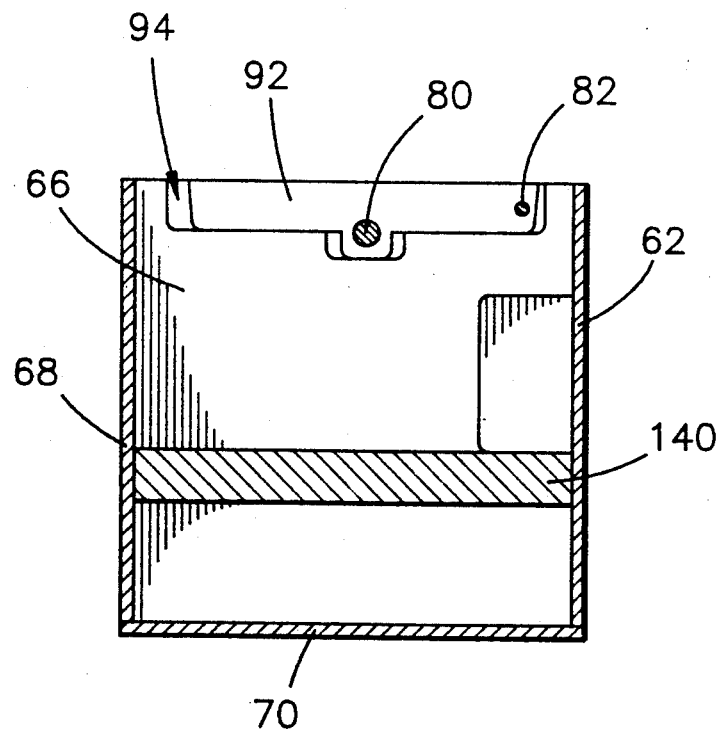
FIG. 7 is a cross-sectional side elevational view taken along line "7—7" of FIG. 4.

Referring now primarily to FIG. 4, bar code scanner 20 includes a carrier member 60 disposed for X- and Y-axes movement in a housing having a front cover 62, side covers 64 and 66, and a rear cover 68. Bar code scanner 20 also includes a base 70 (FIGS. 5-7) and a top cover 72 (FIGS. 1 and 2). It can be seen that the housing of bar code scanner 20 generally comprises a cube.

Carrier member 60 is partly supported and guided for movement back and forth along the X-axis by a main shaft 80 which is journalled in a linear bearing 86 disposed in the carrier member. Carrier member 60 is further supported and guided for movement back and forth along the X-axis by a guide shaft 82 which passes through the carrier member in closely fitting sliding relationship and by cam guide 50 which engages, in closely fitting sliding relationship, a cam guide channel 84 (also FIG. 6) formed in carrier member 60.

Continuing to refer primarily to FIG. 4, the ends of main shaft 80 and guide shaft 82 are fixedly attached to guide rails 90 and 92. Guide rails 90 and 92 are slidingly disposed for movement along the Y-axis in channels 94 and 96 formed, respectively, in the upper edges of side covers 64 and 66. The relationship of guide rail 90, channel 94, and side cover 66 is also shown on FIG. 7.

Reference now to FIG. 5 and recalling the motion component "A—A" of guide bar 22 in FIG. 8 will aid in understanding how X-axis motion of carrier member 60 is achieved. The lower portion 100 of carrier member 60 comprises a channel which engages guide bar 22 in closely fitting sliding relationship. Now, as guide bar 22 rotates, as described above with reference to FIG. 8, its "A—A" motion component will cause carrier member 60 to move back and forth along the X-axis. Being guided in the X-axis by means of main shaft 80, guide shaft 82 and cam guide 50, any Y-axis component of the rotary motion of guide bar 22 will be negated with respect to carrier member 60 by the sliding motion of the guide bar 22 within lower portion 100 of the carrier member.

Reference now to FIG. 6 and recalling the motion component "B—B" of cam guide 50 in FIG. 8 will aid in understanding how Y-axis motion of carrier member 60 is achieved. As cam guide gear 48 rotates, rotating off-centered cam guide 50 will be given a Y-axis motion component with respect to the cam guide gear, which Y-axis motion component is transmitted to carrier 60 by means of the engagement of cam guide 50 with cam guide channel 84 in the carrier. Because cam guide 50 slidingly engages cam guide channel 84, any X-axis component of the rotary motion of the cam guide will be negated with respect to carrier member 60 by such sliding engagement.

Mounted in carrier 60 is a light source/photodetector 120 (FIG. 4), the light source/photodetector being so disposed that it can detect an object placed directly above it. Mounted on carrier 60 beneath light source/photodetector 120 is a printed circuit board 122 (FIG. 3) which includes the electronic circuitry associated with the light source/photodetector. A flexible flat cable 124 FIG. 3) connects printed circuit board 122 to printed circuit board 126 which includes circuitry for speed control and adjustment for motor 36. A receptacle 128 is provided in rear cover 68 for attachment of a cable (not shown) to supply power to bar code scanner 20 and to receive signals therefrom.

In operation, motor 36 (FIG. 3), through the gearing mechanisms described above, provides and synchronizes both X-and Y-axis motions for light source/photodetector 120, such that the light source/photodetector moves in a raster pattern with a constant focal point on a wafer (not shown) placed over a rectangular opening 136 defined in top cover 72, under which opening the light source/photodetector moves. For the embodiment of bar code scanner 20 shown, which is preferably on the order of about two inches on each side, the length of the X-axis sweep of light source/photodetector 120 is on the order of about 0.75 inch, while the gearing to cam guide 50 is such that the Y-axis sweep of the light source/photodetector is on the order of about 0.15 inch and that distance is traversed about every 15 X-axis sweeps. Guide rails 90 and 92 (FIGS. 4 and 5) in channels 94 and 96, respectively, captured between side covers 64 and 66 and top cover 72 (FIG. 1) ensure that light source/photodetector 120 moves in a single horizontal plane.

While bar code scanner 20 may be used in a number of applications, there will be first described the use of the bar code scanner with conventional means for positioning a silicon wafer substrate, to which conventional means the bar code scanner can be easily retrofitted.

Figure 10:
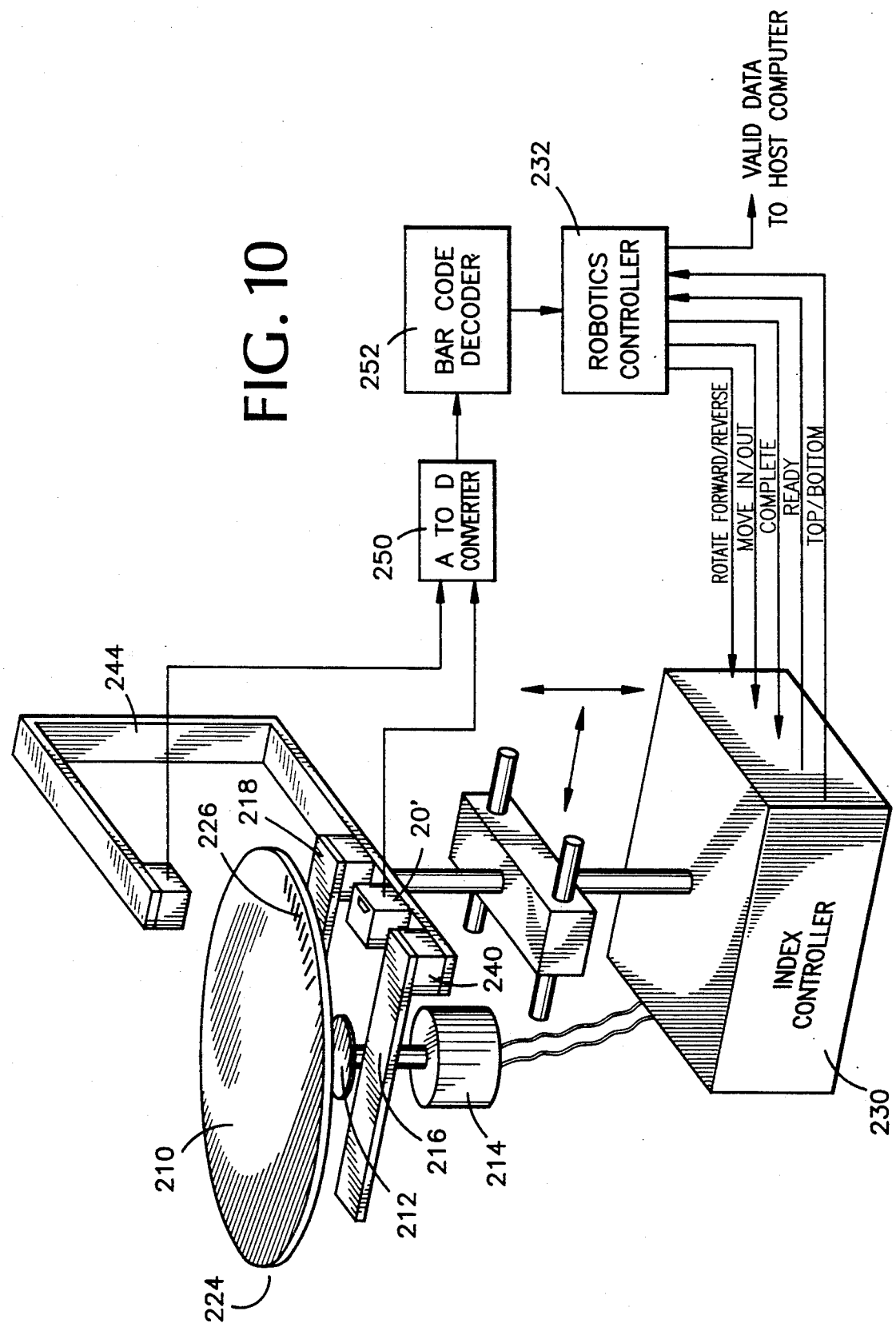
FIG. 10 is a perspective view, partially schematic, illustrating the use of the bar code scanner with conventional silicon wafer positioning equipment.

Referring to FIG. 10, there is shown a wafer 210 positioned above a horizontal disk 212 rotatable by motor 214 and above two, horizontally extending arms 216 and 218 which are movable in and out, that is, toward and away, from the axis of motor 214 and up and down, to lift the wafer from the disk or to place the wafer onto the disk. It will be understood that when wafer 210 is placed on disk 212, the wafer will rotate with the disk. Formed in the periphery of disk 212 is a notch, or flat portion, 224 and formed on the upper surface of the disk, slightly inward from the periphery thereof, and at a known angle with respect to the notch is a bar code 226 which is etched into the disk with a laser (not shown). Motor 214 and arms 216 and 218 are controlled by index controller 230 which is interconnected with robotics controller 232. Robotics controller 232 receives inputs from bar code scanners 20 and 20' through serially connected analog-to-digital converter 250 and bar code decoder 252.

When a wafer, such as wafer 210, is to be positioned, it is moved onto arms 216 and 218 by other equipment (not shown). Arms 216 and 218 then lower wafer 210 onto disk 212 which rotates the disk. Optical sensing equipment (not shown) which provides input to index controller 230 detects the concentricity of, or lack of, the periphery of wafer 210 relative to disk 212. If the nonconcentricity of disk 212, index controller 230 causes the rotation to cease, arms 216 and 218 to lift wafer 210 from disk 212, and the arms to move the wafer in or out from the axis of motor 214 to correct for the nonconcentricity of the disk. Arms 216 and 218 then replace wafer 210 on disk 212 and the wafer is again rotated. The above procedure is reiterated until precise concentricity of wafer 210 is achieved. Wafer 210 is then removed from the positioning operation by other equipment (not shown), while precisely maintaining the position of the wafer, and the wafer is moved to bar code reading equipment (not shown). The bar code reading equipment causes the wafer to continuously rotate. An optical sensor located radially a distance from the center of the wafer at approximately the radial distance of bar code 226 oscillates in and out slightly until the bar code is read. In addition to requiring separate equipment, the conventional method is relatively slow, in that there is a large amount of "no read" time when the bar code is not in proximity to the optical sensor.

Disposed centrally of a horizontal cross-bar 240 which supports arms 216 and 218 is an upwardly facing bar code scanner 20'. Mounted on a frame 244 formed as an extension of cross-bar 240 is a downwardly facing optical bar code scanner 20. Both bar code scanners 20 and 20' may be furnished when bar codes may be placed on either the top or the bottom of wafer 210 or only one or the other may be furnished if bar codes will be placed on only the same side of each wafer.

The distances separating the elements shown on FIG. 10 are exaggerated for clarity and whichever of optical sensors 20 and 20' is being used, it would be positioned about 0.010-0.020 inch from the surface of wafer 210 bearing the bar code.

After the positioning procedure described above has been completed with wafer 210, notch 224 is located with the optical sensing equipment (not shown) and the wafer is rotated to place bar code 226, or a similar bar code if printed on the lower surface of wafer 210, in reading proximity to optical sensors 20 and 20' and the wafer is held motionless on disk 212. Index controller 230 is then commanded by robotics controller 232 to move the appropriate one of optical sensors 20 and 20' near the surface of the wafer. If it is unknown whether the bar code is on the upper or the lower surface of wafer 210, the location can be determined by reading with one and then the other of bar code scanners 20 and 20'. A further advantage of the present invention is that bar code scanners 20 and 20' can be automatically moved in or out to compensate for different diameter wafers. After positioning of the appropriate one of bar code scanners 20 and 20', bar code 226 is scanned by the raster scanning of the light source/photodetector in the bar code scanner and the bar code is read and decoded in the conventional manner. Wafer 210 can then be moved to another station.

FIGS. 11 and 12 illustrate another application for bar code scanner 20, here, in a desktop silicon wafer reader, generally indicated by the reference numeral 300. Reader 300 includes a base member 302, which may be attached to a bench or desktop, and an operating housing 304 selectively rotatable from a position (not shown) in which the housing is folded around the base member to an inclined position (shown on FIGS. 11 and 12) as indicated by the arrow marked "C". Operating housing 304 is held in the inclined position by means of a releasable support member 306.

A locating boss 310 is formed on the upper surface of operating housing 304 to locate thereon a silicon wafer 312 (FIG. 12 only) by means of engagement therewith by a notch (not shown) formed in the edge of the wafer adjacent the bar code. To assist in holding wafer 312 in place on operating housing 304, there are provided a plurality of openings, as at 314, defined in the upper surface of the housing and connected to a source of vacuum (not shown). Cutouts 316 and 318 are provided in the operating housing 304 to facilitate the placement and removal of wafer 312.

A keyboard 320 is provided on the face of operating housing 304 to enter such commands as ON, OFF, VACUUM ON, VACUUM OFF, AND READ. An LCD screen 322 is also provided on the face of operating housing 304 to indicate such information as operating status and the decoded bar code. A cable 324 is connected to scanner 300 from a source of electrical power (not shown). Cable 324 may also provide connection to central computer equipment (not shown), In use of reader 300, wafer 312 is placed on the upper surface of operating housing 304, with an indexing notch (not shown) formed in the edge of the wafer engaging locating boss 310 such that a bar code on the wafer is located over a window 330 in the upper surface. Vacuum is applied at openings 314 and the bar code on wafer 312 read by scanner 20 through window 330. The vacuum is then released and wafer 312 is removed. It will be understood that scanner 20 is so disposed in operating housing 304 that the plane of scanning is parallel to the plane of the bar code.

Reader 300 may be used in either the folded or the inclined position, the inclined position being most suitable for manual use of the reader and the folded position being most suitable for use of the reader when a robotic arm is used to place and remove the wafers.

If desired, and particularly when reader 300 is used with a robotic arm in a manufacturing environment, the reader operations may be controlled by a remote computer console connected to the reader.

Reader 300 is useful in engineering and development settings and as a secondary checking apparatus during manufacturing processes.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figure shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A bar code scanner for reading a bar code on a flat surface of an article, comprising:
   (a) a light source/photodetector;
   (b) first moving means to move said light source/photodetector in an X-axis in a plane parallel to the plane of said bar code;
   (c) second moving means to move said light source/photodetector in a Y-axis in said plane parallel to said plane of said bar code; and
   (d) single motive means to simultaneously provide power to both said first and second moving means; whereby, said light source/photodetector is moved in a raster pattern at a constant distance from said bar code.

2. A bar code scanner, as defined in claim 1, wherein said single motive means comprises a single rotary electric motor.

3. A bar code scanner, as defined in claim 1, further comprising:
   (a) carrier means in which said light source/photodetector is mounted; and
   (b) said first moving means comprising:
      (i) first guide means to move in a circular manner in a plane parallel to the plane of motion of said light source/photodetector, said first guide means comprising an elongate guide bar continuously disposed along said Y-axis; and
      (ii) a first elongate channel defined in said carrier means along said Y-axis, in which channel said first guide means is disposed in sliding engagement;
   such that, upon circular movement of said first guide means, the X-axis component of motion of said first guide means is transmitted to said carrier means, the effect of the Y-axis component of motion of said first guide means being negated by the sliding of said first guide means within said first elongate channel.

4. A bar code scanner, as defined in claim 3, further comprising:
   (a) a first end of said elongate guide bar is rotatably attached to a first disk
   (b) a second end of said elongate guide bar is rotatably attached to a second disk; and
   (c) said first and second disks are operatively connected to said motive means for rotation thereby.

5. A bar code scanner, as defined in claim 1, further comprising:
   (a) carrier means in which said photodetector is mounted; and
   (b) said second moving means comprising:
      (i) second guide means to move in a circular motion in a plane parallel to the plane of motion of said photodetector, said second guide means comprising a cylindrical, vertical cam guide mounted on said second guide means and disposed such that the major axis thereof is orthogonal to the plane of said circular motion of said second guide means; and
      (ii) a second elongate channel defined in said carrier means along said X-axis, in which channel said second guide means is disposed in sliding engagement;
   such that, upon circular movement of said second guide means, the Y-axis component of motion of said second guide means will be transmitted to said carrier means, the effect of the X-axis component of motion of said second guide means being negated by the sliding of said second guide means within said second elongate channel.

6. A desktop bar code scanner system, comprising:
   (a) a base member;
   (b) an operating housing in which said bar code scanner is mounted, said operating housing being selectively rotatable from a horizontal position folded with said base member to an inclined position;
   (c) said operating housing including an upper surface upon which a silicon wafer is placed for the reading of a bar code thereon;
   (d) a bar code scanner disposed in said operating housing;
   (e) said upper surface including an opening therein through which a light source/photodetector in said bar code scanner reads said bar code, said bar code scanner being so mounted that the plane of scanning is parallel to the plane of said bar code;
   (f) means to hold said silicon wafer in place on said upper surface with said bar code positioned in proximity to said window; and
   (g) means to move said light source/photodetector in a raster pattern at a constant distance from said bar code.

7. A bar code scanner, as defined in claim 6, further including vacuum means operatively disposed adjacent said upper surface to help hold said wafer in place.

8. A bar code scanner for reading a bar code on a flat surface of an article, comprising:
   (a) a light source/photodetector;
   (b) first moving means to move said light source/photodetector in an X-axis in a plane parallel to the plane of said bar code;
   (c) second moving means to move said light source/photodetector in a Y-axis in said plane parallel to said plane of said bar code;
   (d) motive means to simultaneously provide power to said first and second moving means to move said light source/photodetector in a raster pattern at a constant distance from said bar code;
   (e) carrier means in which said light source/photodetector is mounted;
   (f) said first moving means comprising:

(i) first guide means to move in a circular manner in a plane parallel to the plane of motion of said light source/photodetector;

(ii) a first elongate channel defined in said carrier means along said Y-axis, in which channel said first guide means is disposed in sliding engagement such that, upon circular movement of said first guide means, the X-axis component of motion of said first guide means is transmitted to said carrier means, the effect of the Y-axis component of motion of said first guide means being negated by the sliding of said first guide means within said first elongate channel;

(g) said first guide means comprising an elongate guide bar disposed along said Y-axis;

(h) a first end of said elongate guide bar being rotatably attached to a first disk;

(i) a second end of said elongate guide bar being rotatably attached to a second disk; and (j) said first and second disks being operatively connected to said motive means for rotation thereby.

9. A bar code scanner, as defined in claim 8, wherein said motive means comprises a single rotary electric motor.

10. A bar code scanner system for reading a bar code on a flat surface of an article, comprising:

(a) a light source/photodetector;

(b) first moving means to move said light source/photodetector in an X-axis in a plane parallel to the plane of said bar code;

(c) second moving means to move said light source/photodetector in a Y-axis in said plane parallel to said plane of said bar code;

(d) single motive means to simultaneously provide power to both said first and second moving means; whereby, said light source/photodetector is moved in a raster pattern at a constant distance from said bar code; and (e) positioning equipment to bring said bar code scanner in reading proximity to said bar code on said article.

11. A bar code scanner system, as defined in claim 10, wherein said positioning equipment further comprises means to move said bar code scanner into reading proximity with a bar code on a silicon wafer.

12. A desktop bar code scanner system for reading a bar code on a flat surface of a silicon wafer, including a bar code scanner comprising:

(a) a light source/photodetector;

(b) first moving means to move said light source/photodetector in an X-axis in a plane parallel to the plane of said bar code;

(c) second moving means to move said light source/photodetector in a Y-axis in said plane parallel to said plane of said bar code; and (d) motive means to simultaneously provide power to said first and second moving means; whereby, said light source/photodetector is moved in a raster pattern in a plane a constant distance from said bar code; said desktop bar code scanner system further including:

(e) a base member;

(f) an operating housing in which said bar code scanner is mounted, said operating housing being selectively rotatable from a horizontal position folded with said base member to an inclined position;

(g) said operating housing including an upper surface upon which a silicon wafer is placed for the reading of a bar code thereon;

(h) said upper surface including an opening therein through which said bar code scanner reads said bar code, said bar code scanner being so mounted that the plane of scanning is parallel to the plane of said bar code;

(i) means to support said silicon wafer such that said bar code is read through said opening; and (j) means to move said light source/photodetector in a raster pattern at a constant distance from said bar code.

13. A desktop bar code scanner system, as defined in claim 12, further including vacuum means operatively disposed adjacent said upper surface to help hold said wafer in place.

14. A desktop bar code scanner system, as defined in claim 12, wherein said single motive means comprises a single rotary electric motor.

15. A bar code scanner system, as defined in claim 12, further comprising:

(a) carrier means in which said light source/photodetector is mounted; and (b) said first moving means comprising:

(i) first guide means to move in a circular manner in a plane parallel to the plane of motion of said photodetector, said first guide means comprising an elongate guide bar continuously disposed along said Y-axis; and (ii) a first elongate channel defined in said carrier means along said Y-axis, in which channel said first guide means is disposed in sliding engagement;

such that, upon circular movement of said first guide means, the X-axis component of motion of said first guide means is transmitted to said carrier means, the effect of the Y-axis component of motion of said first guide means being negated by the sliding of said first guide means within said first elongate channel.

16. A bar code scanner system, as defined in claim 15, further comprising:

(a) a first end of said elongate guide bar is rotatably attached to a first disk (b) a second end of said elongate guide bar is rotatably attached to a second disk; and (c) said first and second disks are operatively connected to said motive means for rotation thereby.

17. A bar code scanner, as defined in claim 12, further comprising:

(a) carrier means in which said photodetector is mounted; and (b) said second moving means comprising:

(i) second guide means to move in a circular motion in a plane parallel to the plane of motion of said light source/photodetector, said second guide means comprising a cylindrical, vertical cam guide mounted on said second guide means and disposed such that the major axis thereof is orthogonal to the plane of said circular motion of said second guide means; and (ii) a second elongate channel defined in said carrier means along said X-axis, in which channel said second guide means is disposed in sliding engagement;

such that, upon circular movement of said second guide means, the Y-axis component of motion of said second guide means is transmitted to said carrier means, the effect of the X-axis component of motion of said second guide means being negated by the sliding of said second guide means within said second elongate channel.

* * * * *